United States Patent
Bastide et al.

(10) Patent No.: US 10,437,890 B2
(45) Date of Patent: *Oct. 8, 2019

(54) ENHANCED DOCUMENT INPUT PARSING

(71) Applicant: International Business Machines Corporation, Armonk, NY (US)

(72) Inventors: Paul R. Bastide, Boxford, MA (US); Matthew E. Broomhall, South Burlington, VT (US); Robert E. Loredo, North Miami Beach, FL (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/168,682

(22) Filed: May 31, 2016

(65) Prior Publication Data
US 2016/0275069 A1 Sep. 22, 2016

Related U.S. Application Data

(63) Continuation of application No. 13/928,642, filed on Jun. 27, 2013, now Pat. No. 9,418,066.

(51) Int. Cl.
*G06F 16/93* (2019.01)
*G06F 16/332* (2019.01)
(Continued)

(52) U.S. Cl.
CPC .......... *G06F 16/93* (2019.01); *G06F 16/3329* (2019.01); *G06F 17/24* (2013.01); *G06F 17/2705* (2013.01); *G06N 7/005* (2013.01)

(58) Field of Classification Search
CPC ............. G06F 17/2247; G06F 17/2705; G06F 17/272; G06F 17/30864; G06F 17/3089;
(Continued)

(56) References Cited

U.S. PATENT DOCUMENTS 7,721,200 B2 * 5/2010 Grigoriadis ........... G06F 17/248
715/243
7,757,163 B2 7/2010 Doganata et al.
(Continued)

FOREIGN PATENT DOCUMENTS

WO 2010089248 8/2010

OTHER PUBLICATIONS

Notice of Allowance for U.S. Appl. No. 14/489,747, dated Sep. 20, 2016, 12 pages.
(Continued)

*Primary Examiner* — Michael Pham
(74) *Attorney, Agent, or Firm* — Van Leeuwen & Van Leeuwen; David B. Woycechowsky

(57) ABSTRACT

An approach is provided for an information handling system that includes a processor and a memory to analyze documents. In the approach, an electronic document is received with the document including content, such as text, and revision metadata that is associated with the content. The revision metadata is analyzed and the approach identifies a confidence level based on the analysis. The confidence level is associated with the electronic document content. The confidence level can then be utilized by a Question and Answer (QA) system.

11 Claims, 6 Drawing Sheets

(51) Int. Cl.
*G06N 7/00* (2006.01)
*G06F 17/27* (2006.01)
*G06F 17/24* (2006.01)

(58) Field of Classification Search
CPC ......... G06F 17/30867; G06F 17/30675; G06F 17/30882; G06F 16/93; G06F 16/3329; G06F 17/24; G06N 5/04; G06N 99/005; G06N 5/02; G06N 5/003; G06N 7/005; G06Q 30/02
USPC .................................................. 707/755, 748
See application file for complete search history.

(56) References Cited

U.S. PATENT DOCUMENTS

| | | |
|---|---|---|
| 8,019,780 B1 | 9/2011 | Pinkerton et al. |
| 2004/0243403 A1 | 12/2004 | Matsunaga et al. |
| 2004/0261016 A1 | 12/2004 | Glass et al. |
| 2007/0033221 A1 | 2/2007 | Copperman et al. |
| 2007/0094285 A1 | 4/2007 | Agichtein et al. |
| 2007/0180388 A1* | 8/2007 | Izhikevich ............. G06Q 10/10 715/751 |
| 2008/0040114 A1 | 2/2008 | Zhou et al. |
| 2009/0144609 A1 | 6/2009 | Liang et al. |
| 2009/0287678 A1 | 11/2009 | Brown et al. |
| 2010/0114561 A1 | 5/2010 | Yasin |
| 2011/0060584 A1 | 3/2011 | Ferrucci et al. |
| 2011/0066587 A1 | 3/2011 | Ferrucci et al. |
| 2011/0125734 A1 | 5/2011 | Duboue et al. |
| 2011/0225140 A1* | 9/2011 | Wu ................... G06F 17/30867 707/709 |
| 2012/0078926 A1 | 3/2012 | Chu-Carroll et al. |
| 2012/0084112 A1 | 4/2012 | Bagchi et al. |
| 2012/0089622 A1 | 4/2012 | Fan et al. |
| 2013/0007037 A1 | 1/2013 | Azzam et al. |
| 2013/0124268 A1* | 5/2013 | Hatton ........... G06Q 10/063112 705/7.38 |
| 2013/0132308 A1 | 5/2013 | Boss et al. |
| 2014/0006012 A1 | 1/2014 | Zhou et al. |
| 2014/0136521 A1 | 5/2014 | Pappas |
| 2015/0006449 A1 | 1/2015 | Bastide et al. |
| 2015/0006554 A1 | 1/2015 | Bastide et al. |

OTHER PUBLICATIONS

Office Action for U.S. Appl. No. 13/928,642, U.S. Patent and Trademark Office, dated Jul. 15, 2015, 17 pages.
Final Office Action for U.S. Appl. No. 13/928,642, U.S. Patent and Trademark Office, dated Feb. 16, 2016, 20 pages.
Ferrucci et al., "Building Watson: An Overview of the DeepQA project," 2010, Association for the Advancement of Artificial Intelligence, ISSN 0738-4602, pp. 59-79.
Office Action for U.S. Appl. No. 14/489,747, U.S. Patent and Trademark Office, dated Apr. 12, 2016, 21 pages.
Notice of Allowance for U.S. Appl. No. 13/928,642, U.S. Patent and Trademark Office, dated May 10, 2016, 12 pages.

* cited by examiner

ENHANCED DOCUMENT INPUT PARSING

BACKGROUND OF THE INVENTION

The present application relates generally to an improved data processing apparatus and method and more specifically to mechanisms for determining the answers to questions input to a Question and Answer (QA) system when the answer is not explicitly provided in the corpus of information operated on by the QA system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

As QA systems, such as the Watson™ system, are built to answer complex questions, new data and literature is loaded into the system to fine tune the capabilities of the system, and to better answer such questions. Better data input into the QA system generally results in better answers from the system. The data input to the system may include structured and unstructured data such as documents, spreadsheets and presentations. The data may have already been review (e.g., evaluation and analysis, etc.) as part of a typical document editing lifecycle. The typical lifecycle includes a group of people creating, editing and reviewing the content included in a document. Various commonly used word processors have different processes used to track changes, or revisions, in documents during the lifecycle. These editing lifecycle features modify and add metadata to the underlying document. Oftentimes, the underlying document is rich with alternate versions, spellings and mistakes which have been corrected or modified during the lifecycle.

SUMMARY

An approach is provided for an information handling system that includes a processor and a memory to analyze documents. In the approach, an electronic document is received with the document including content, such as text, and revision metadata that is associated with the content. The revision metadata is analyzed and the approach identifies a confidence level based on the analysis. The confidence level is associated with the electronic document content. The confidence level can then be utilized by a Question and Answer (QA) system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
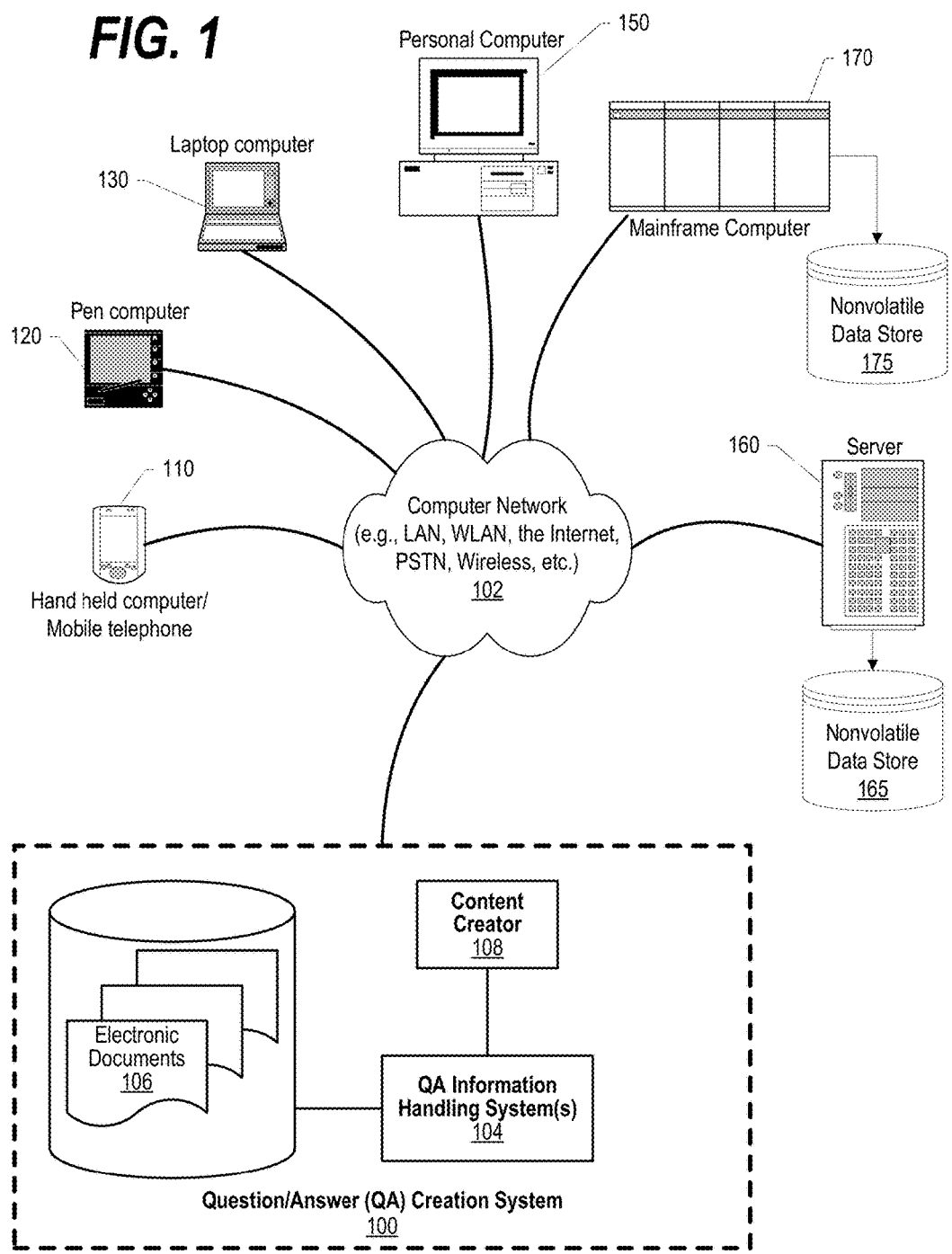
FIG. 1 depicts a network environment that includes a Question/Answer (QA) Creation System.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more content users. Other embodiments of the QA system 100 may be used with components, systems, sub-systems, and/or devices other than those that are depicted herein.

The QA system 100 may be configured to receive inputs from various sources. For example, the QA system 100 may receive input from the network 102, a corpus of electronic documents 106 or other data, a content creator 108, content users, and other possible sources of input. In one embodiment, some or all of the inputs to the QA system 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that the QA system 100 may operate in environments of any size, including local and global, e.g., the Internet.

In one embodiment, the content creator creates content in a document 106 for use as part of a corpus of data with the QA system 100. The document 106 may include any file, text, article, or source of data for use in the QA system 100. Content users may access the QA system 100 via a network connection or an Internet connection to the network 102, and may input questions to the QA system 100 that may be answered by the content in the corpus of data. In one embodiment, the questions may be formed using natural language. The QA system 100 may interpret the question and provide a response to the content user containing one or more answers to the question. In some embodiments, the QA system 100 may provide a response to users in a ranked list of answers.

In some illustrative embodiments, the QA system 100 may be the Watson™ system available from International Business Machines Corporation of Armonk, N.Y., which is augmented with the mechanisms of the illustrative embodiments described hereafter. The Watson™ QA system may receive an input question which it then parses to extract the major features of the question, that in turn are then used to formulate queries that are applied to the corpus of data.

Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
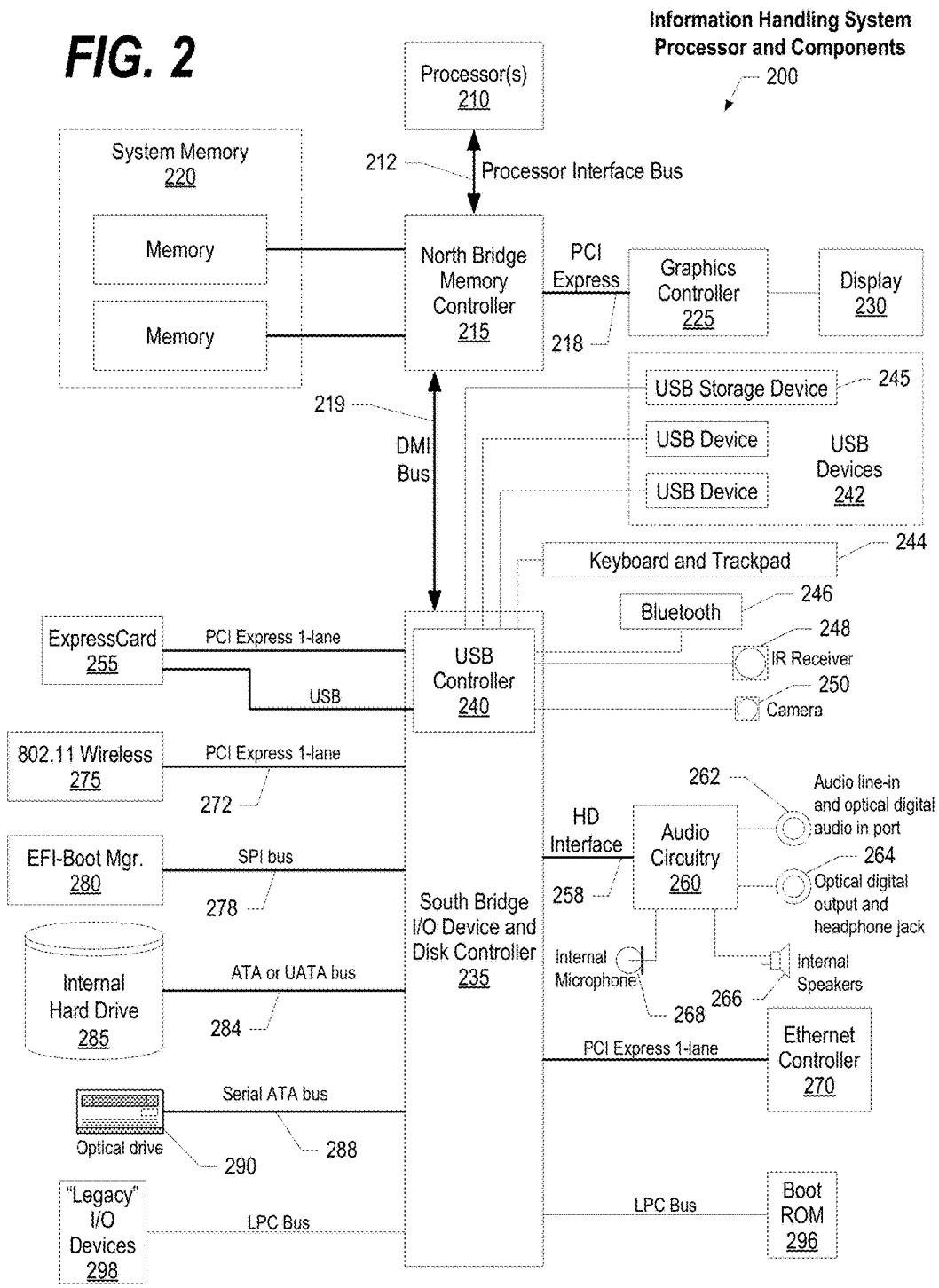
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-6 depict an approach that can be executed on an information handling system, to enhance document input parsing, evaluation and analysis to provide better data input into a Question/Answer (QA) creation system, such as QA system 100 shown in FIG. 1. The approach described herein enhances document input parsing, evaluation and analysis. Document revisions and annotations are stored in a memory or data store accessible to the system. Documents are analyzed in relation to the content of the document revisions and annotations. Parsed information is provided to a document analysis model where the analyzed segments include a variability recorded as a confidence metric. Further, confidence based scores, metrics or statistics may be generated during the lifecycle of the document. This approach works in many environments, even those that do not retain previous copies of revised documents. The approach improve QA systems, such as Watson™, by providing a higher degree of accuracy with the confidence in the parsed data providing an added dimension for document input analysis. The approach discussed above is further described in FIGS. 3-6 and accompanying detailed descriptions, discussed below, which provide further details related to one or more embodiments that enhance document input parsing, evaluation and analysis to provide better data input into a QA system.

Figure 3:
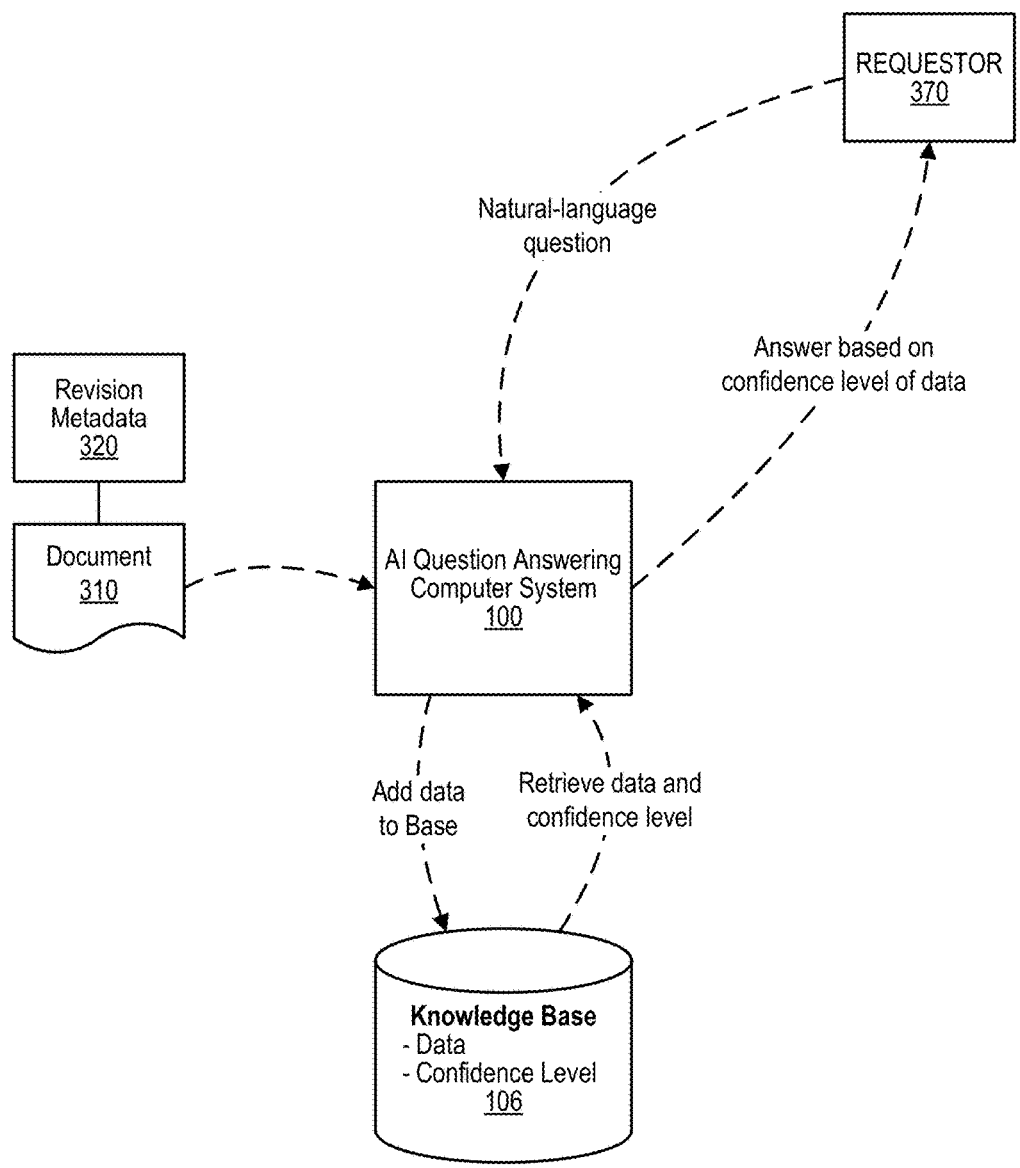
FIG. 3 is a component diagram depicting components used to enhance document input parsing, evaluation and analysis to provide better data input into a Question/Answer (QA) creation system.

FIG. 3 is a component diagram depicting components used to enhance document input parsing, evaluation and analysis to provide better data input into Question/Answer (QA) creation system 100. Electronic document 310, such as an electronic document created by a word processor that supports one or more document review/revision functions (e.g., comment, revision, added object, etc.) are received by QA system 100. Being an electronic document created by a word processor that supports one or more document review/revision, the electronic document includes both content (e.g., text, figures, tables, etc.) as well as revision metadata 320. The revision metadata are the comments, revisions, added objects, etc. that have been added to the electronic document by one or more revision authors (revision authors being authors that reviewed/revised the document). In addition, the revision metadata includes the revision author associated with each of the revision metadata items (e.g., comments, revisions, added objects, etc.).

Figure 4:
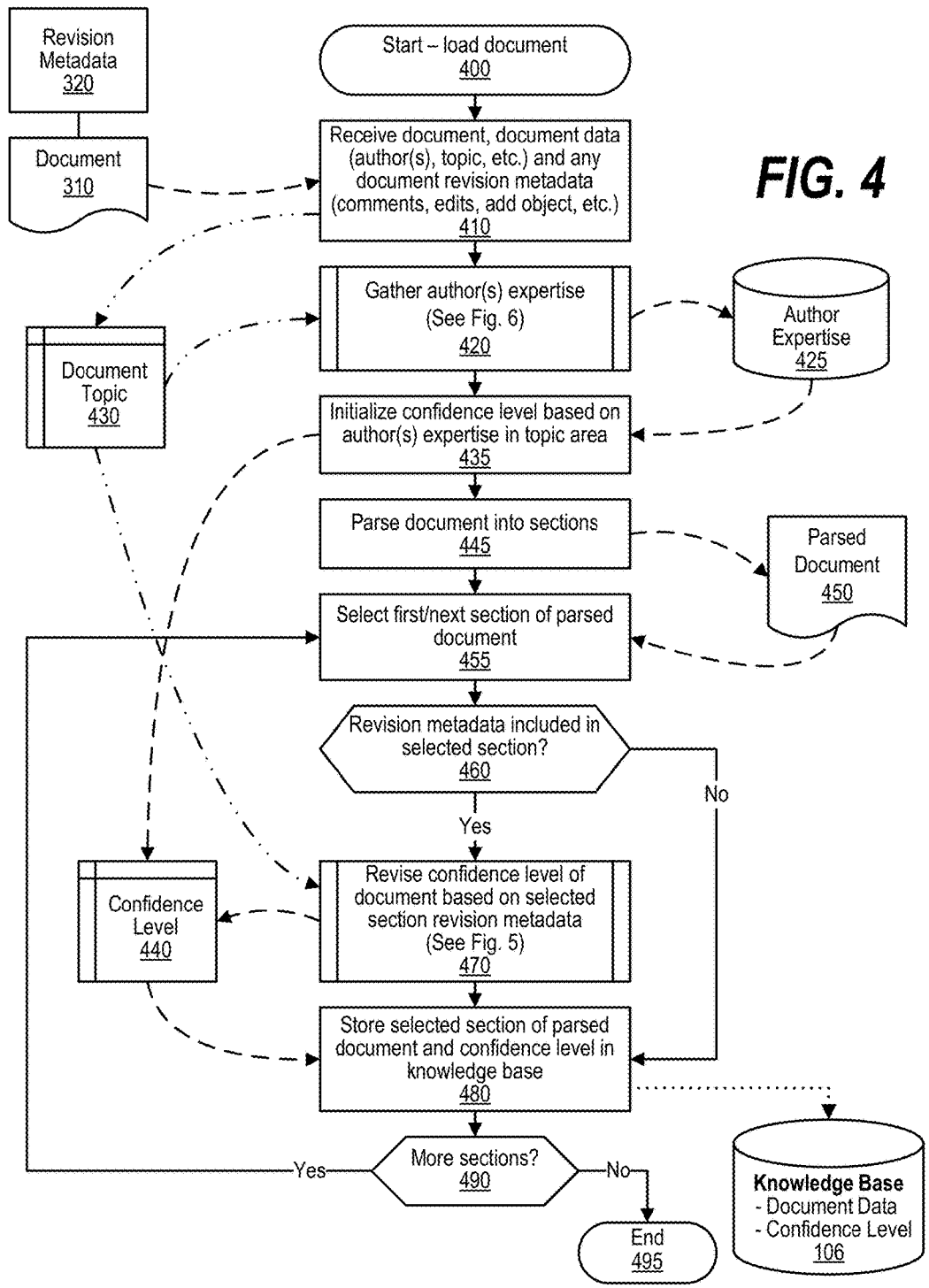
FIG. 4 is a depiction of a flowchart showing the logic used in loading a document that includes revision metadata.
Figure 5:
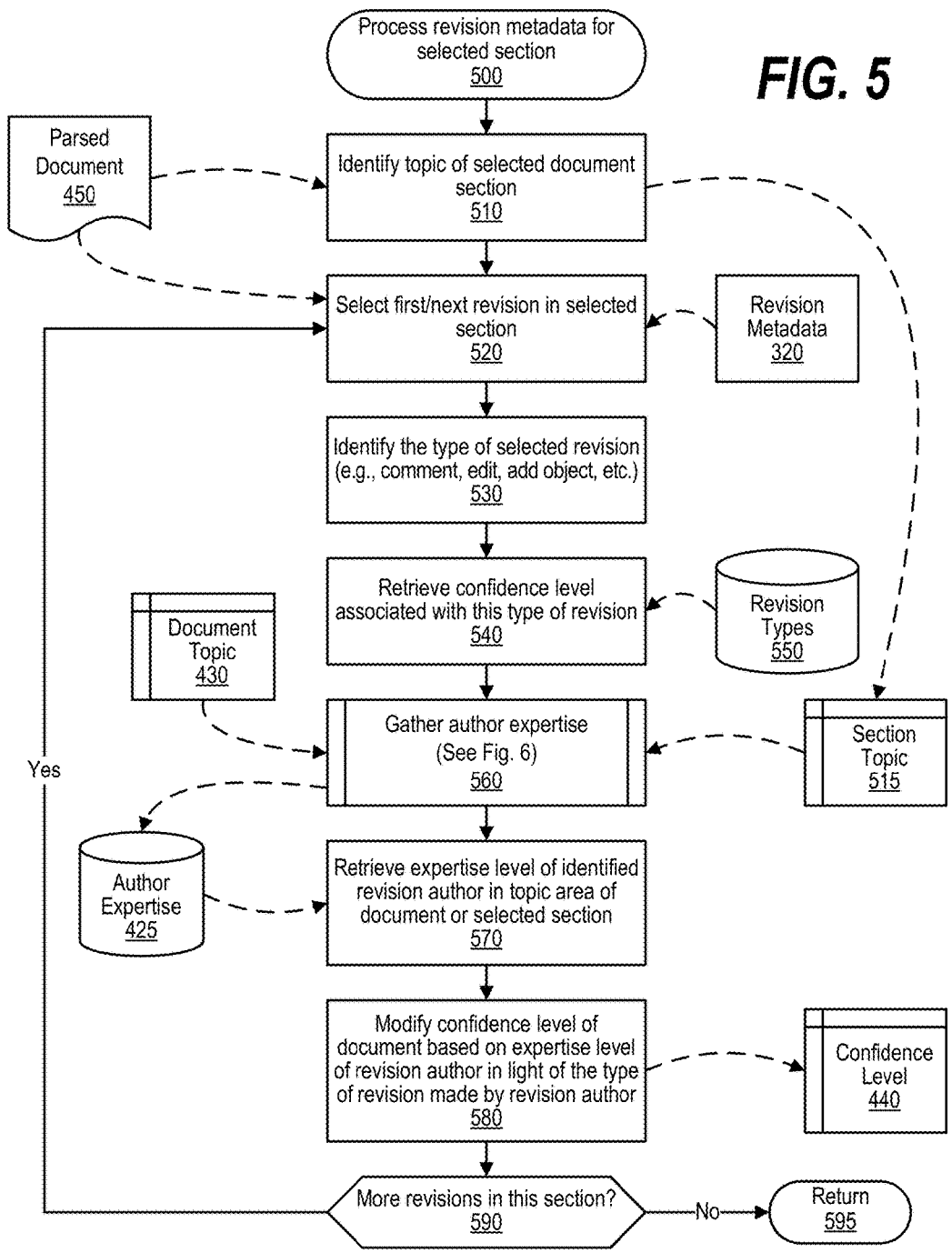
FIG. 5 is a depiction of a flowchart showing the logic used to process revision metadata for a selected section of the document.
Figure 6:
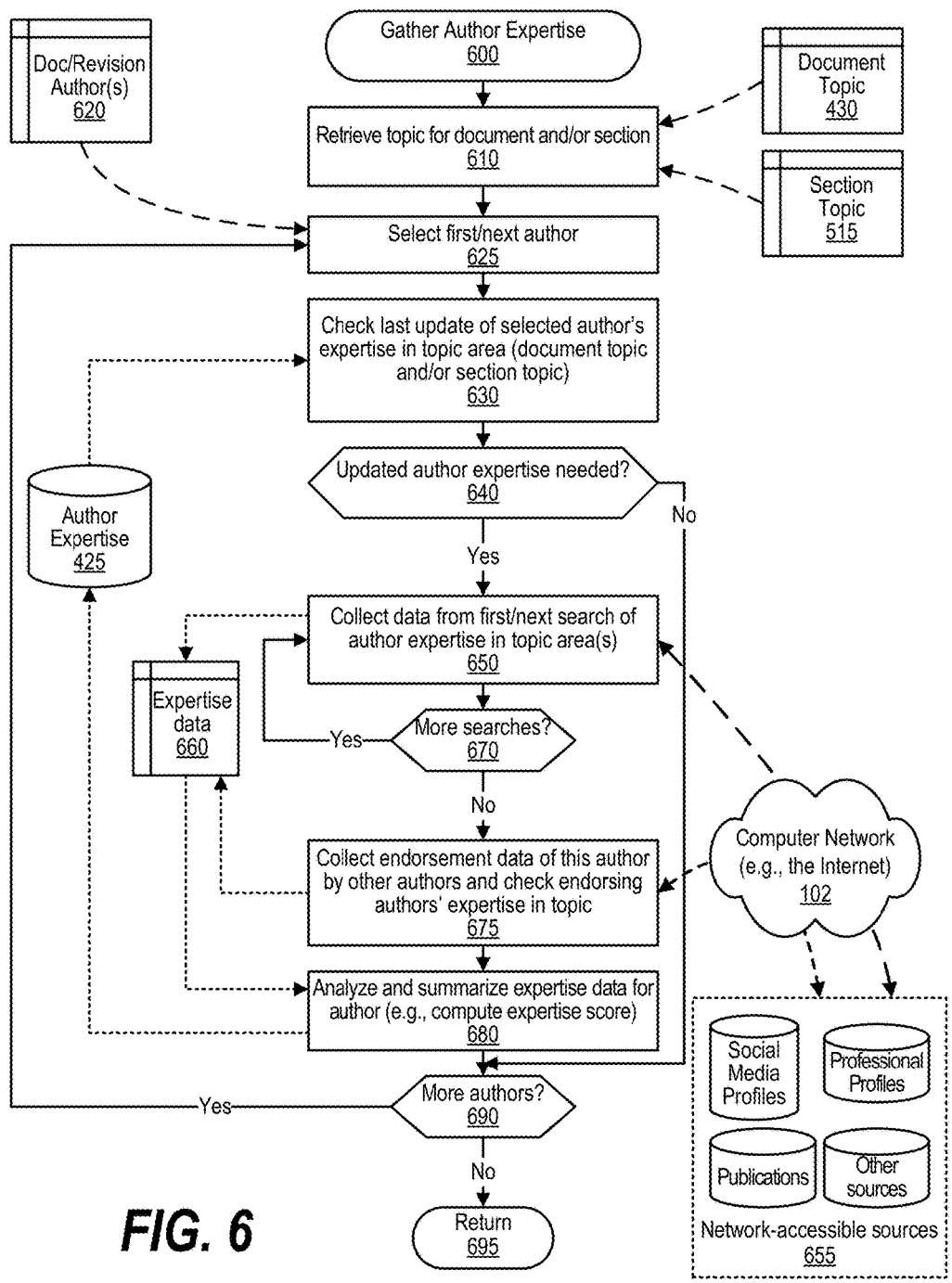
FIG. 6 is a depiction of a flowchart showing the logic performed to gather author expertise information pertaining to various authors that contributed revision metadata.

As further described in FIGS. 4-6, QA system 100 determines a confidence level to associate with the contents of the electronic document based on the extent to which the document was reviewed/revised as well as the expertise level of not only the document author but also the expertise level of the revision authors.

As used herein, confidence level, is a measure of the accuracy of a document based upon an internal examination of the revision effort that was performed on the document. In addition, the confidence level computed by the system can also eventually be used as an input to QA systems, such as Watson™, of the knowledge base information in a test and training for machine learning. The electronic document contents and the confidence level are stored in knowledge base 106, which includes a corpus of electronic documents as well as confidence levels pertaining to those electronic documents that included revision metadata. Based on the word processor being used, a single electronic document file may include both the electronic document contents 310 as well as associated revision metadata 320. Other word processors may break a single electronic document into multiple files with one or more files used to store the electronic document contents and one or more files used to store the revision metadata. In any case, as used herein, the electronic document includes both the content of the electronic document as well as the revision metadata associated with such content.

After electronic documents have been stored in knowledge base 106, QA system 100 receives requests from requestor 370. The request can be in the form of a natural language (NL) question. The QA system retrieves document contents and associated confidence levels from knowledge base 106 and can answer the question based not only on the contents of the documents but also on the confidence level associated with such contents. In this manner, contents with a high confidence level can be preferably used by the QA system over contents with lower, or no, confidence levels.

FIG. 4 is a depiction of a flowchart showing the logic used in loading a document that includes revision metadata. Processing commences at 400 whereupon, at step 410, the QA system receives document 310 and any document revision metadata 320 as input. The document includes metadata such as the document author and may also include topic information, such as found in titles, headers, and the like. Revision metadata 320 includes review/revision data associated with the document contents, such as comments, edits, added objects, etc., added to the document by one or more revision authors. The overall document topic is extracted (e.g., from the title, etc.) and stored in memory area 430.

At predefined process 420, the process gathers document author expertise data pertaining to the author(s) of the electronic document (see FIG. 6 and corresponding text for processing details). The author expertise data gathered by predefined process 420 is used to update author expertise data store 425. At step 435, the process initializes the electronic document's confidence level based on the expertise level of the document author(s). The confidence level is stored in memory area 440.

At step 445, the process parses the electronic document into one or more sections based upon a review of the electronic document contents. For example, if an electronic document includes multiple parts with a title/heading identifying each of the parts, the process could parse the electronic document based on the multiple parts so that each part is treated as a separate section. The parsed document is stored in electronic document file 450.

At step 455, the process selects the first section of the parsed document. At decision 460, the process checks revision metadata 320 to determine whether the selected section has any revision metadata associated with it (e.g., any comments, revisions, edits, added objects, etc.). If the process identifies any revision metadata included in the selected section, then decision 460 branches to the "yes" branch to process the section. At predefined process 470, the process revises the document confidence level based on the selected section's revision metadata (see FIG. 5 and corresponding text for processing details). The revised confidence level is stored in memory area 440. The confidence level is a measure of the accuracy of a document based upon an internal examination of the revision effort that was performed on the document. In addition, the confidence level computed by the system can also eventually be used as an input to QA systems, such as Watson™, of the knowledge base information in a test and training for machine learning. Furthermore, other factors may effect the confidence level. Accordingly, predefined process 470 may be updating an already-established confidence level that pertains to the document. For example, a base confidence level might be established based on the type of journal or repository in which the document was found with the processing shown in FIGS. 4-6 used to modify the base confidence level.

In addition, the confidence level of each document section can be retained so that the QA system can have further granularity regarding the confidence level within a given document. For example, one section of the document may have numerous revision metadata from highly qualified revision authors, while another section may be void of such revision metadata. If confidence level for each of the sections is being maintained, then this section-based confidence level is also stored in memory area 440. On the other hand, if no revision metadata is included in the selected section, then decision 460 branches to the "no" branch bypassing predefined process 470. If section-based confidence level is being maintained, then the "no" branch would note that no revision metadata was found in the selected section (e.g., setting a section-based revision metadata to zero, etc.).

At step 480, the process stores the selected section of the parsed document in knowledge base 106 and associates the stored section with the confidence level determined by predefined process 470 for the section (or notes that no revision metadata was found for the selected section). A decision is made as to whether there are more sections in the electronic document to process (decision 490). If there are more sections to process, then decision 490 branches to the "yes" branch which loops back to select and process the next section of the electronic document as described above. This looping continues until all sections of the electronic document have been processed, at which point decision 490 branches to the "no" branch and processing of the electronic document ends at 495. In addition, when all sections of the electronic document have been processed, the overall electronic document confidence level is stored in knowledge base 106.

FIG. 5 is a depiction of a flowchart showing the logic used to process revision metadata for a selected section of the document. Processing commences at 500 whereupon, at step 510, the process identifies the topic of the selected section from parsed electronic document 450 (e.g., identifying a section title, header, etc.). The identified section title is stored in memory area 515. At step 520, the process selects the first revision in the selected section from revision metadata 320. At step 530, the process identifies the type, or kind, of revision made in the selected revision (e.g., a comment, an edit, an added object, etc.). At step 540, the process retrieves a confidence level associated with the identified revision type from revision type data store 550. For example, a simple correction of a typographical error may not increase the confidence level as much as a lengthy comment or an object that was added to the document. Likewise, lengthy added text, or deleted text, may increase the confidence level more than a minor edit.

At predefined process 560, the expertise of the revision author (the author that made the revision) is gathered (see FIG. 6 and corresponding text for processing details). Predefined process 560 takes both the document topic and the section topic as inputs in order to ascertain the expertise level of the revision author. The result of predefined process 560 is the expertise of the revision author which is stored in author expertise data store 425.

At step 570, the process retrieves the expertise level of the identified revision author in the topic area of the electronic document and/or the selected section of the electronic document. At step 580, the process modifies the confidence level of the electronic document based on the expertise level of revision author in light of the type of revision that was performed by revision author. A larger increase to the confidence level is made when the revision author is found to have great expertise in the document topic area or the document section topic area than when the author is not found to possess a high level of expertise. Similarly, a larger increase is made when the type of revision indicates that the revision author made a more substantial contribution (e.g., large edit, lengthy comment, added object, etc.) than when the type of revision indicates a smaller contribution (e.g., small edit, correction of typographical error, etc.). The revised confidence level is stored in memory area 440.

A decision is made as to whether there are additional revisions in the selected section of the electronic document to process (decision 590). If there are additional revisions to process, then decision 590 branches to the "yes" branch which loops back to select and process the next revision as discussed above. This looping continues until all of the revisions in the selected section have been processed, at which point decision 590 branches to the "no" branch and processing returns to the calling routine (see FIG. 4) at 595.

FIG. 6 is a depiction of a flowchart showing the logic performed to gather author expertise information pertaining to various authors that contributed revision metadata. Processing commences at 600 whereupon, at step 610, the process retrieves the topic for the electronic document and/or the selected section of the electronic document from memory areas 430 and 515, respectively. In some instances, multiple authors may have contributed, either by writing the electronic document contents or by collaborating on a particular document revision. At step 625, the process selects the first author from the list of document, or revision, authors, from memory area 620.

At step 630, the process checks when the last update of the selected author's expertise was performed in the topic area (document topic and/or section topic which may be based on whether the author is one of the document author or whether the author is a revision author). Steps 630 checks the author's expertise by retrieving available author expertise data previously collected and stored in data store 425. Such data may also include a timestamp indicating when the data was last collected. A decision is made as to whether updated author expertise data is needed for the selected author (decision 640). A threshold may be used in decision 640, such as to collect updated expertise data if expertise data has not been collected for the select author in some period of time, such as a week, thirty days, etc. If updated author expertise data has already been collected for the selected author within the established time period, then decision 640 branches to the "no" branch bypassing steps 650 through 680. On the other hand, if updated author expertise data is needed for the selected author, then decision 640 branches to the "yes" branch to gather such author expertise data.

At step 650, the process collects data from a first search of the author expertise in to document and/or section topic areas. As shown, step 650 collects the search data using tools, such as search engines, to search network accessible sources 655 accessible through computer network 102, such as the Internet. These network accessible sources can include data stores such as social media profiles of the selected author, other publications authored by the selected author, professional profiles (e.g., university profiles, organizational profiles, etc.) of the selected author, and any other network-accessible sources. The author expertise data collected is stored in memory area 660. A decision is made as to whether additional searches are needed (decision 670). If more searches are needed, then decision 670 branches to the "yes" branch which loops back to collect data from the next search that is performed. This looping continues until no further searches are performed for expertise regarding the selected author, at which point decision 670 branches to the "no" branch. At step 675, endorsement data is collected for the selected author with such endorsement data being retrieved from other authors and professionals with step 675 further checking the expertise level of the endorsing authors in the document and/or section topic. This endorsement data is also stored in expertise data memory area 660.

At step 680, the process analyzes and summarizes the set of collected expertise data pertaining to the selected author. In one embodiment, the process computes an "expertise score" based upon the analysis of the author's expertise in the document and/or section topic areas. This analysis, summary, and expertise score is stored in author expertise data store 425 and is used to update any previously gathered expertise data for the selected author.

A decision is made as to whether there are more authors associated with document or revision metadata being analyzed in the call to this routine (decision 690). If there are more authors to process, then decision 690 branches to the "yes" branch which loops back to select and process the next author as described above. This looping continues until all of the authors for the document or revision have been processed, at which point decision 690 branches to the "no" branch and processing returns to the calling routine (either FIG. 4 or FIG. 5) at 695.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
one or more processors;
a memory coupled to at least one of the processors;
a network adapter that connects the information handling system to a computer network; and
a set of instructions stored in the memory and executed by at least one of the processors to analyze documents, wherein the set of instructions perform actions of:
receiving, at a question answer system, an electronic document that includes a content and a revision metadata generated by at least one identified revision author;
retrieving, from an endorser at the question answer system, endorsement data that endorses the identified revision author, wherein the endorser is different than the identified revision author;
identifying, by the question answer system, a topic area associated with the electronic document;
collecting, from one or more network sources by the question answer system, expertise-related data corresponding to the revision author relative to the identified topic area;
determining, by the question answer system, a revision author expertise level of the identified revision author based upon the endorsement data and the expertise-related data;
identifying, by the question answer system, a confidence level based on the revision author expertise level;
assigning, by the question answer system, the confidence level to the electronic document content; and
in response to determining that the confidence level of the electronic document is higher than a different confidence level of a different document:

selecting, by the question answer system, the electronic document over the different electronic document; and generating, by the question answer system, one or more answers to a question based, at least in part, on the selected electronic document.

2. The information handling system of claim 1 wherein the actions further comprise:

parsing the electronic document into a plurality of sections; and analyzing each of the plurality of sections based on a corresponding one of a plurality of revisions included in the revision metadata.

3. The information handling system of claim 1 wherein the identified revision author corresponds to a selected one of a plurality of revisions in the revision metadata.

4. The information handling system of claim 3 wherein the actions further comprise:

identifying a revision type associated with the selected revision, wherein the confidence level is based on the revision type.

5. The information handling system of claim 1 wherein the actions further comprise:

determining an endorser expertise of the endorser based on the endorsement data and the identified topic area, wherein the revision author expertise level is adjusted based on the endorser expertise.

6. The information handling system of claim 1 wherein the actions further comprise:

identifying at least one document author associated with the electronic document;

collecting author expertise-related data pertaining to the identified document author from at least one of the one or more network sources; and determining a document author expertise level associated with the identified document author based on the collected author expertise-related data, wherein the confidence level is adjusted based on the document author expertise level.

7. A computer program product stored in a non-transitory computer readable medium, comprising computer instructions that, when executed by an information handling system, causes the information handling system to analyze documents by performing actions comprising:

receiving, at a question answer system, an electronic document that includes a content and a revision metadata generated by at least one identified revision author;

retrieving, from an endorser at the question answer system, endorsement data that endorses the identified revision author, wherein the endorser is different than the identified revision author;

identifying, by the question answer system, a topic area associated with the electronic document;

collecting, from one or more network sources by the question answer system, expertise-related data corresponding to the revision author relative to the identified topic area;

determining, by the question answer system, a revision author expertise level of the identified revision author based upon the endorsement data and the expertise-related data;

identifying, by the question answer system, a confidence level based on the revision author expertise level;

assigning, by the question answer system, the confidence level to the electronic document content; and in response to determining that the confidence level of the electronic document is higher than a different confidence level of a different document:

selecting, by the question answer system, the electronic document over the different electronic document; and generating, by the question answer system, one or more answers to a question based, at least in part, on the selected electronic document.

8. The computer program product of claim 7 wherein the actions further comprise:

parsing the electronic document into a plurality of sections; and analyzing each of the plurality of sections based on a corresponding one of a plurality of revisions included in the revision metadata.

9. The computer program product of claim 7 wherein the identified revision author corresponds to a selected one of a plurality of revisions in the revision metadata.

10. The computer program product of claim 7 wherein the actions further comprise:

identifying a revision type associated with the selected revision, wherein the confidence level is based on the revision type; and determining an endorser expertise of the endorser based on the endorsement data and the identified topic area, wherein the revision author expertise level is adjusted based on the endorser expertise.

11. The computer program product of claim 7 wherein the actions further comprise:

identifying at least one document author associated with the electronic document;

collecting author expertise-related data pertaining to the identified document author from at least one of the one or more network sources; and determining a document author expertise level associated with the identified document author based on the collected author expertise-related data, wherein the confidence level is adjusted based on the document author expertise level.

* * * * *